United States Patent Office 3,525,662
Patented Aug. 25, 1970

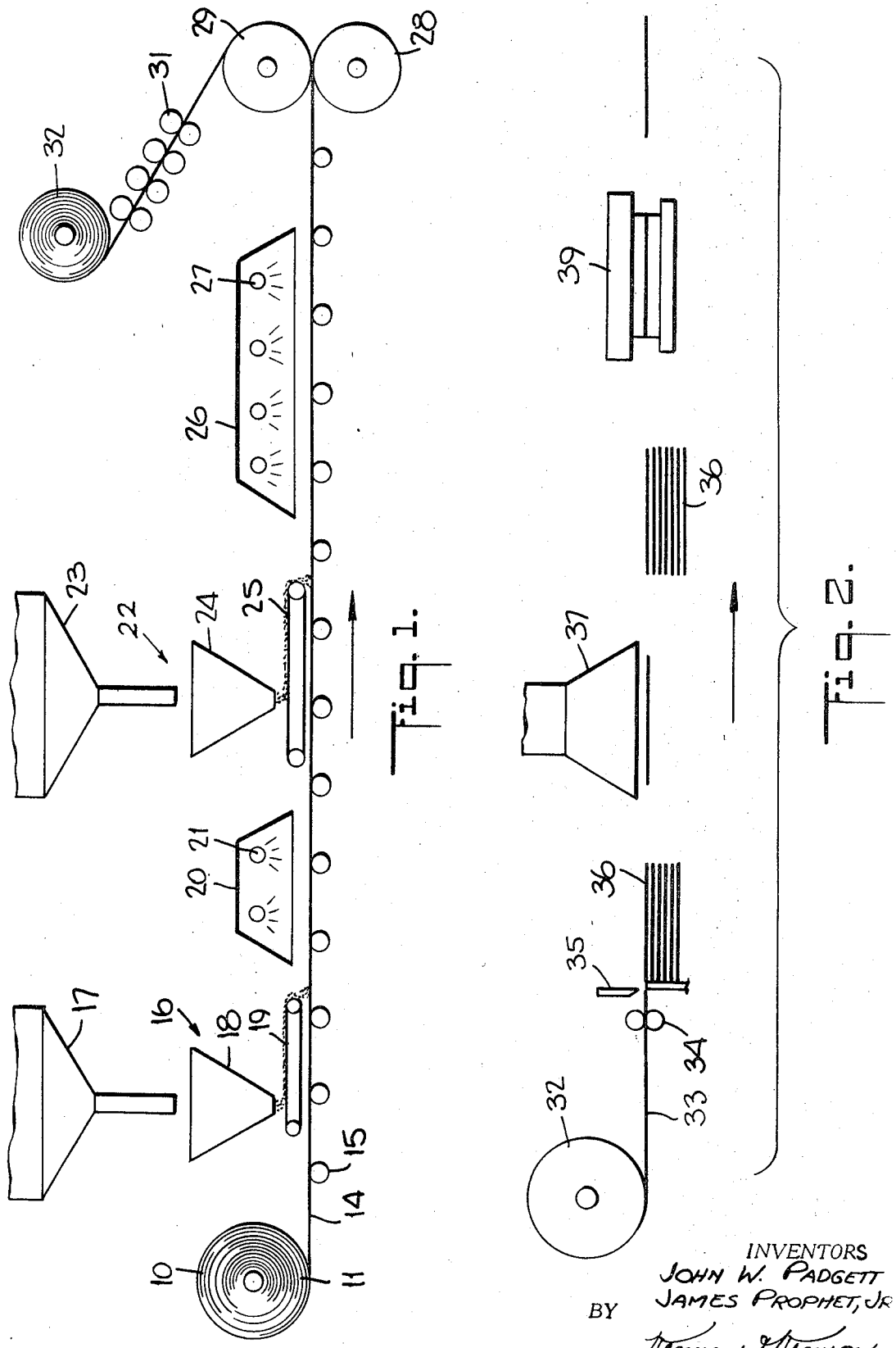

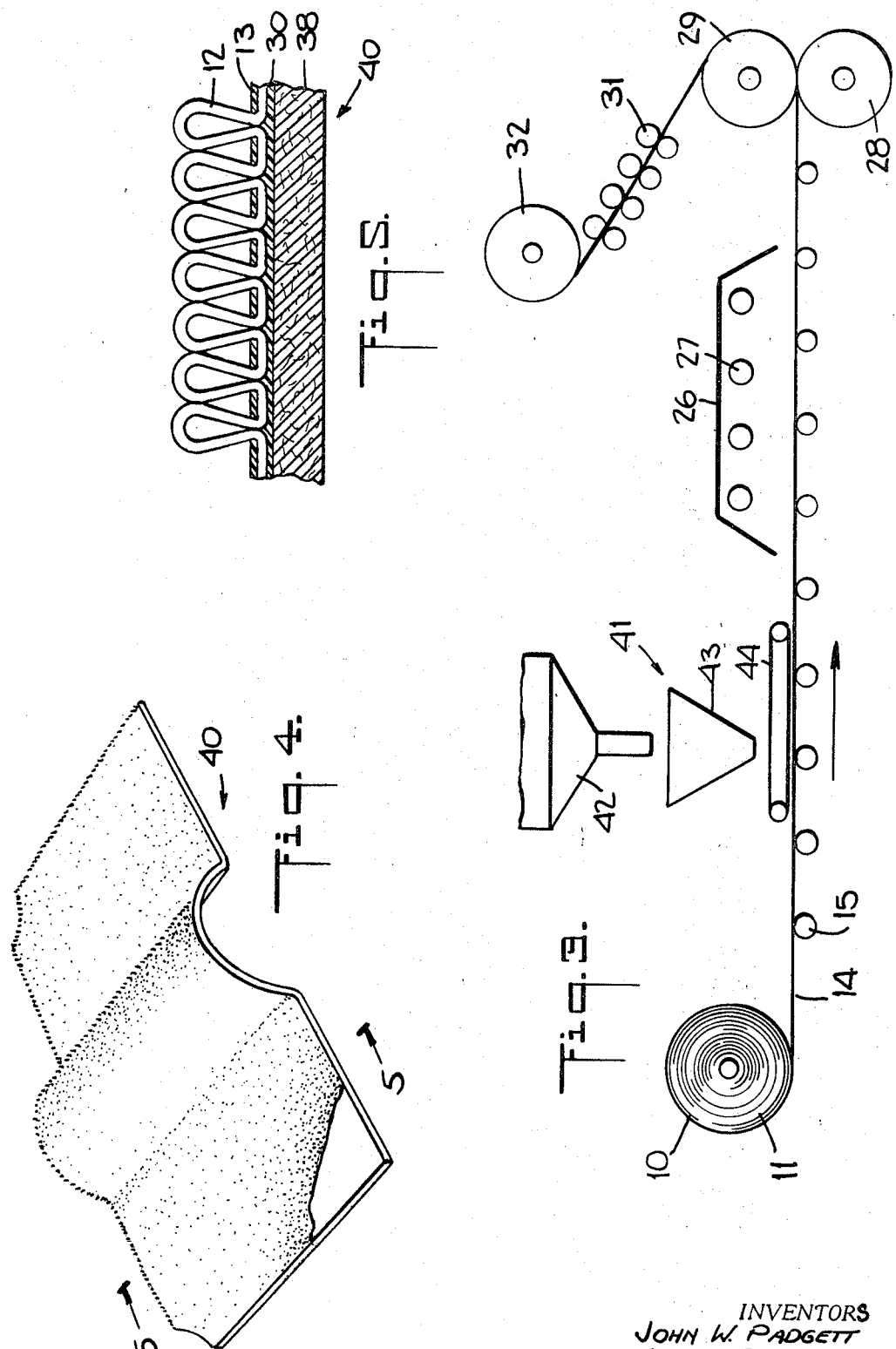

3,525,662
COMPOSITE CONTOURED CARPETS FOR AUTOMOBILES AND THE LIKE AND METHOD FOR MAKING THE SAME
John W. Padgett, Bernardsville, and James Prophet, Jr., Cranford, N.J., assignors to Moore & Munger, New York, N.Y., a partnership
Filed Aug. 15, 1966, Ser. No. 572,348
Int. Cl. D05c 17/02
U.S. Cl. 161—67    22 Claims

ABSTRACT OF THE DISCLOSURE

A method of making carpets and the resultant article in which the coating layer applied to the backing scrim consists of a powdered high viscosity polyolefin and a powdered low viscosity saturated hydrocarbon. The high viscosity material, which constitutes the major proportion of the coating, can be polyethylene. The low viscosity material can be petroleum wax, synthetic Fischer-Tropsch wax, mineral wax or low molecular weight polymerized olefin. The high viscosity material comprises 55 to 95% of the coating by weight and has a melt index not in excess of 70 and a density between 0.900–0.940. The low viscosity material has a molecular weight considerably lower than the polyolefin and has a melting point not less than 190° F. and a viscosity not exceeding 1000 centipoises at 125° C. The powders can be premixed and applied to the carpet simultaneously or the low viscosity material can be applied to the carpet first.

---

This invention relates to composite contoured carpets which are particularly useful in automobile flooring, and to processes for making the same.

It is common practice in the making of carpets for automobile floors and the like to manufacture a composite carpet which comprises a tufted pile carpet material locked into a backing material, usually jute scrim, by a thermoplastic coating, and a cushioning back pad of jute or other suitable material bonded to the thermoplastic coating. The carpeting material is generally a synthetic yarn, such as dyed nylon-acetate or polypropylene, tufted through the jute scrim so as to form large tufts on its top side.

In the usual coating operation, a roll of woven, tufted and dyed carpeting material is unwound so that the jute scrim, or "underside," of the carpet faces upward. A coating of polyethylene powder is then applied to the jute scrim and is heated to form a continuous layer. The fused polyethylene partially enters the interstices of the scrim, and, upon cooling and hardening locks the tufts of the carpeting material to the scrim web.

Thereafter, a cushioning layer of jute is applied to the underside of the carpet and the whole is molded into the desired shape. Conveniently, this is accomplished by reheating the polyethylene coating on the underside of a cut piece of carpet until it becomes plastic and then applying a jute cushioning pad thereto, while simultaneously forming the whole into a desired shape in a cold mold. When released from the mold, the cooled carpet is complete and retains the shape corresponding to the contours of the automobile floor.

Despite the manufacturing advantages of the above described method, there are several disadvantages associated with it. One of these is the relatively slow speed of the plastic coating operation. The limiting speed of this operation increases the cost of manufacture and holds down desirable levels of productivity. Attempts to increase the speed of processing have shown that the bonding of the tufts to the web is weakened, with the result that the carpet lacks cohesion and strength.

Another disadvantage of the presently known processes for the manufacture of molded automobile carpeting is that the resulting carpet is subject to excessive wear underfoot, particularly in the area where the driver's feet rest. Because of this excessive wear the carpet becomes unsightly and must often be replaced or covered by less desirable means, such as rubber mats. It is obvious that the wearing qualities of the carpeting material are of paramount importance.

It is therefore a primary object of the present invention to provide a process for the manufacture of a novel carpet having outstanding wearing characteristics.

It is a further object of the present invention to provide a process for the manufacture of superior coated carpets which significantly improves the rate of manufacture and reduces manufacturing costs.

In the process according to this invention there is applied to the backing scrim or web of a carpeting material a coating layer of a thermoplastic material comprising a major proportion of a powdered high viscosity polyolefin such as polyethylene and a minor proportion of a powdered low viscosity saturated hydrocarbon, such as petroleum wax, synthetic Fischer-Tropsch wax, mineral wax, vegetable wax, or low molecular weight polymerized olefin such as polymerized ethylene. The polyolefin may be a standard commercial high molecular weight polymer such as polyethylene. The saturated hydrocarbon is a material of considerably lower molecular weight and viscosity than the polyolefin. The terms "high viscosity" and "low viscosity" are applied to the polyolefin and the saturated hydrocarbon herein to denote the viscosities of these materials relative to each other. The polyolefin comprises 55 to 95% of the weight of the coating material and is characterized by a melt index not in excess of 70 and a density in the range of 0.900–0.940. The low molecular weight saturated hydrocarbon, which makes up the balance of the coating material, comprises 5 to 45% of the weight thereof and is characterized by a melting point not less than 190° F. and a viscosity not exceeding 1000 centipoises at 125° C.

After application of the thermoplastic coating, the carpet may be prepared by techniques that are generally similar to the usual process, with a few exceptions to be noted hereinafter.

This invention will now be described in greater detail with reference to the accompanying drawings in which:

FIG. 1 is a schematic diagram illustrating one embodiment of the coating stage of the process of the invention;

FIG. 2 is a schematic diagram of the molding stage of the process of the invention;

FIG. 3 is a schematic diagram illustrating an alternative embodiment of the coating stage of the process of the invention;

FIG. 4 is a perspective view of a molded automobile carpet made according to the present invention; and FIG. 5 is a sectional view of a molded automobile carpet according to this invention, taken along line 5—5 of FIG. 4.

Referring to FIG. 1, there is shown a dispensing roll 10 of uncoated carpet material 11 which is continuously fed in the direction of the arrow. The carpeting material comprises a tufted yarn 12, preferably of synthetic material such as nylon-acetate or polypropylene, and a jute scrim 13, as seen best in FIG. 5. The tufts of yarn 12 are woven between the interstices of the jute scrim 13. As the carpeting material 11 is unwound from the roll 10, the underside or backing 13 faces upward and the tufts of the intertwined yarn 12 face downward. A web 14 of the carpeting material 11 continuously moves on support rollers 15 so that the backing 13 passes underneath a first feeding station 16 which is adapted to dispense a powdered low viscosity saturated hydrocarbon, the characteristics of which are important and which will be described with more particularity below.

Feeding station 16 includes a storage hopper 17 for storage of the powdered low viscosity saturated hydrocarbon, and underlying feed hopper 18 for dispensing the powdered saturated hydrocarbon, and a dispensing belt 19 which receives the saturated hydrocarbon from the feed hopper 18 and uniformly distributes it on the upwardly facing backing surface 12 of carpeting material 11 as it passes underneath. Many other designs and means of distribution of the saturated hydrocarbon are suitable, it being noted here that the important factor is a uniform distribution of the powder across the entire surface of the carpet backing 13.

After the powdered saturated hydrocarbon has been applied thereto, the carpeting material passes underneath a heating element 20 comprising a bank of radiant heating lamps 21, gas burners or the like. This heating element 20 preheats the low-viscosity saturated hydrocarbon but does not liquefy it. Although heating element 20 provides a certain degree of control over the relative rates of penetration of the low viscosity saturated hydrocarbon and the subsequently applied high viscosity polyolefin into the carpet backing, this heating element 20 is not necessary to the operation and may optionally be eliminated.

The carpeting web with the preheated low viscosity saturated hydrocarbon powder thereon passes underneath a second feeding station 22, which uniformly dispenses a high viscosity powdered polyolefin such as polyethylene through storage hopper 23, feed hopper 24, and dispensing belt 25. Thereafter, the web 14 passes underneath the main fluxing heater 26, which has a plurality of radiant heating lamps 27 which soften both the high viscosity polyolefin and the low viscosity saturated hydrocarbon and permit both to fuse and flow so as to penetrate the backing while in the molten condition. The low viscosity saturated hydrocarbon penetrates more quickly and further into the carpet than does the high viscosity polyolefin, and this is true regardless of whether the saturated hydrocarbon powder is applied first, as indicated in FIG. 1, or is applied simultaneously with the polyolefin as a blended mixture as depicted in FIG. 3. The web 14 then moves between cold pressure rolls 28 and 29, which squeeze the fused layer of softened high viscosity polyolefin and low viscosity saturated hydrocarbon, forcing some into the web 14 and creating a fairly uniform coating 30 (see FIG. 5) over the surface of the backing 13. The usual roll pressure at the nip of cold rolls 28 and 29 is about 90 to 100 p.s.i. Excessive pressure, however, may cause mat-down of the tufts and/or strike-through of the back coating, and the actual optimum operating pressure must be determined in an empirical manner.

As the carpeting material 11 passes through rolls 28 and 29, the molten or softened coating is cooled and solidified into a flexible but substantially continuous film, and the whole is passed through conveying rollers 31 to take-up roll 32.

After the coating operation the carpeting is generally either stored or is sent directly to the "mold line" for completion of the carpet. This stage of the process is shown schematically in FIG. 2. There the take-up roll 32 of the coating line becomes the dispensing roll 32. A web 33 of the coated carpet is fed through guide rollers 34 and beneath a knife 35 which cuts the carpet into pieces 36 of a predetermined length. From there the coated carpet pieces 36, with the coating 30 up, are passed one by one underneath a heater 37 which softens the coating. A jute backing member 38 (see FIG. 5), cut to a length equal to the length of the coated carpet piece, is then placed on top of the coating 30, and the entire assembly of coated carpet piece 36 and jute backing pad 38 are placed in a cold fiberglass mold 39, wherein the softened coating 30 is brought into forceful contact with the jute backing 38, and the whole pressed at about 80 p.s.i. air pressure into the shape provided by the mold.

The mold 39 is provided with a circulating coolant. As the coating 30 cools and solidifies, the jute backing adheres thereto. When removed from the mold 39, the composite carpet 40 (see FIGS. 4 and 5) has the contour of the automobile floor, as provided by the mold.

An alternative coating line processing arrangement, shown in FIG. 3, may be used instead of the arrangement shown in FIG. 1. In this embodiment there is only a single feeding system 41, which dispenses a mixture of high viscosity polyolefin and low viscosity saturated hydrocarbon, instead of separate feeding systems for the two components. Referring now to FIG. 3, there is shown a dispensing roll 10 of uncoated carpeting material 11 which is identical to the uncoated carpeting material described with reference to FIG. 1. A web 14 of this uncoated carpeting material is passed over support rolls 15 and beneath the feeding system 41, which comprises a storage hopper 42 for a powder mixture of high viscosity polyolefin and low viscosity saturated hydrocarbon, a feed hopper 43, and a dispensing belt 44. The web 14 with the powder mixture of high viscosity polyolefin and low viscosity saturated hydrocarbon thereon, passes beneath heater 26 which includes a plurality of radiant heating lamps 27 as previously described. The heater 26 causes the powdered mixture to soften and flow. The low viscosity saturated hydrocarbon penetrates more deeply into the carpeting material than does the high viscosity polyolefin, although the differences in degree of penetration in this embodiment are less marked than the embodiment shown in FIG. 1. The whole web 14 then moves between cold pressure rolls 28 and 29. These rolls squeeze the fused layer of softened polyolefin and low viscosity saturated hydrocarbon, forcing some into the web, and creating a fairly uniform coating over the surface of the backing 13. As the carpet passes through rolls 28 and 29, the molten or softened coating 30 cools and solidifies into a flexible but substantially continuous film, and the whole is passed through conveying rollers 31 to take-up roll 32 as previously described. The coated composite carpet on take-up roll 32 is then molded as previously described in connection with FIG. 2.

High moisture content in the carpet has been found to deleteriously affect the physical properties, particularly tuft pull and Tabor wear. It is therefore advisable to maintain the moisture content below 6% by weight and preferably below about 2%.

Control of moisture can be obtained by means of a heating element (not shown) overlaying the carpet material between the dispensing roll 10 and the feeding stations 16 or 41 as depicted in FIGS. 1 and 3, respectively.

Having thus briefly described the process steps by which a carpet according to the present invention can be made, it is noted that unexpected processing advantages are associated in particular with the coating process as shown in either FIG. 1 or FIG. 3. In that stage, significantly faster manufacturing speed is attainable as the result of the use of the novel blend of high viscosity polyolefin and low viscosity saturated hydrocarbon. The rate of coating can be increased by at least 20 percent, and in some cases by as much as 100 percent. A typical coating speed in the present process is about 12 to 20 yards per minute, depending on many factors such as the width of the carpet and the heating capacity of the heating elements. This unexpected increase is productivity without any loss in product quality (as measured by the standard tuft-lock tension test) is one of the remarkable achievements of this invention.

As a result of the higher coating speed in the present process, the pressure in the nip of cold rolls 28 and 29 is somewhat higher than the usual cold roll pressures in previous processes. A typical roll pressure in the present process is about 90 to 100 pounds p.s.i. while a pressure of about 60 to 70 pounds p.s.i. was typical in previous processes.

The present invention has also resulted in the manufacture of a carpeting material which enjoys remarkable wearing qualities. Visually rated comparative tests of Tabor Wear on specimens made according to this invention and those made according to the prior known method employing polyethylene as the sole thermoplastic coating material show that the carpet of this invention is far superior in its ability to withstand continued wear.

The physical and chemical compositions of the coating material are of are of critical importance in achieving the objects of the present invention. The polyolefin component is generally of high molecular weight and is invariably of higher viscosity, compared to the low viscosity saturated hydrocarbon component. The polyolefin is preferably a polyethyelne of the type referred to in the art as high pressure or low density polyethylene. However, polypropylene, and ethylene-propylene polymers are satisfactory. The high viscosity polyolefin comprises between 55 and 95 percent by weight of the coating composition, and is preferably about 80 percent.

The melt index of the polyolefin should not exceed 70 and preferably should be between about 8 and 22. At melt indices above 70, the physical strength of polyethylene becomes seriously reduced, particularly at low temperatures. On the other hand, the lower the melting index, the tougher and smoother the resulting film, and the better the low temperature properties. However, at very low melt indices, e.g. at about 5 or below, the polymer becomes difficult to process on presently available equipment. We have found that at a melt index value of 12, polyethylene handles and trims well on the molding line and produces a smooth tough blemish-free coating, even though polyethylene of somewhat higher melt index, for example, about 20 or slightly higher, was generally required in prior art processes wherein polyethylene was the sole thermoplastic material. When polypropylene or ethylene-propylene copolymer is substituted for polyethylene, the melt indices are about the same as in the case of polyethylene.

The density of the polyolefin should be between about 0.900 and about 0.940. In the case of polyethylene, a preferred density is in the range of 0.915 to 0.940; a value of 0.923 has been found to be quite satisfactory. Polyethylene within this density range is "low quality" or "high pressure" polyethylene. "Linear" high density polyethylenes are generally not preferred because of their lack of flexibility.

The low viscosity saturated hydrocarbon component comprises between 5 and 45 percent of the total coating composition, preferably about 20 percent, and is characterized by a melting point of not less than 190° F. and a viscosity not exceeding 1000 centipoises at 125° C.

Various saturated hydrocarbon waxes are eminently suitable as the low viscosity saturated hydrocarbon material in this invention. This wax can be either a petroleum wax, a mineral wax, a vegetable wax or a synthetic Fischer-Tropsch wax, the latter being preferred. A typical good Fischer-Tropsch wax is one having an ASTM melting point of 215° F. and an ASTM penetration (at 77° F.) of 1.5. Best results are obtained in chemically inert waxes having neutralization, saponification and bromine values of zero.

A low molecular weight polymerized olefin such as polymerized ethylene can be used in lieu of a hydrocarbon wax if desired, provided the viscosity and melting point are within the limits set forth above.

The properties desired in the low viscosity saturated hydrocarbon, in addition to the melting point and viscosity ranges already mentioned, are good flow characteristics in powder form, low melt viscosity, good color, oxidation stability, and good strength properties in blends with the high viscosity polyolefin.

The property of free-flow in powdered form is particularly important for both the high viscosity polyolefin and the low viscosity saturated hydrocarbon. Tackiness, large particles, too many fines or a tendency to ball-up, can cause severe problems. To avoid such difficulties it is best that the particle size distribution be controlled so as to eliminate excessively large or excessively small particles. A typical satisfactory particle size distribution is as follows:

| U.S. Standard sieve: | Percent retained |
|---|---|
| 16 | 0 |
| 20 | 5 |
| 30 | 40 |
| 50 | 30 |
| 70 | 20 |
| 100 | 4 |
| In pan | 1 |

The basic difference between the embodiment of FIGS. 1 and 3 is that in the latter the two components of the coating composition are applied together as a blend of powders, whereas in the former they are applied independently, with the low viscosity saturated hydrocarbon component being applied first. Although the so-called two drop method illustrated in FIG. 1 calls for additional dispensing equipment, it eliminates any complicated blending apparatus, and also appears to give an improved product. In either embodiment, the coating composition, when fluxed and squeezed into the carpet backing, has a concentration gradient in which the polyolefin is present in greater concentration at the outer surface of the coating than in the interior thereof. Conversely, the low viscosity component is present in greater concentration in the interior of the coating, which is in proximity with the yarn 12 and jute scrim 13. The concentration gradient is greater in the two drop process of FIG. 1 than in the process of FIG. 3. The improvements noted in these two embodiments are not evident when the high viscosity polyolefin is applied first, followed by the low viscosity material.

A coated carpet of the invention is visualized as one in which the low viscosity hydrocarbon component softens and flows more readily than the more viscous polyolefin component and that consequently the low viscosity component preferentially penetrates the backing and coats the fibers of the tufts or other carpeting material and fills voids and other sources of fractional wear. On the other hand, the more viscous polyolefins preferentially stays near the outer surface of the carpet where it forms a strong and flexible surface coating.

Inasmuch as the carpet of the present invention has appreciably longer wear than do carpets of the prior art, it retains a good appearance, even on the driver's side, for a considerably greater length of time. This makes the replacement of the carpet or alternatively the use of floor mates unnecessary.

What is claimed is:

1. In a process for manufacturing a composite contoured carpet for automobiles and the like, the steps comprising
   (1) applying free flowing powder high viscosity polyolefin and a free flowing powdered low viscosity saturated solid hydrocarbon uniformly to the undersurface of a carpet material, said low viscosity hydrocarbon having a melting point not less than 190° F. and a viscosity not exceeding 1000 centipoises at 125° C., the weight ratio of high viscosity polyolefin to low viscosity hydrocarbon being in the range of 55:45 to 95:5;
   (2) applying heat to said powdered polyolefin and said powdered saturated hydrocarbon in an amount sufficient to melt said powders and permit flow thereof; and
   (3) passing said carpet through cold rollers under sufficient pressure to form a continuous flexible coating of solid thermoplastic material.

2. A process according to claim 1 in which said polyolefin has a density of 0.900 to 0.940 and a melt index not in excess of 70.

3. A process according to claim 1 in which said high viscosity polyolefin is polyethylene.

4. A process according to claim 3 in which said polyethylene has a density of 0.915 to 0.940 and a melt index of 8 to 22.

5. A process according to claim 1 in which the weight ratio of high viscosity polyolefin to low viscosity saturated hydrocarbon is in the range of 75:25 to 80:20.

6. A process according to claim 1 in which said powdered high viscosity polyolefin and said powdered low viscosity saturated hydrocarbon are premixed and applied simultaneously to said carpet material.

7. A process according to claim 1 in which said powdered low viscosity saturated hydrocarbon is applied to the undersurface of said carpet material and thereafter said powdered high viscosity polyolefin is applied to said undersurface.

8. A process according to claim 7 in which said powdered low viscosity saturated hydrocarbon is heated to cause at least partial fusion thereof before said powdered high viscosity polyolefin is applied.

9. A process according to claim 1 in which the particles of said powdered high viscosity polyolefin and said powdered low viscosity hydrocarbon are of such size that 100 percent of the particles pass through a 16 mesh screen and 99 percent are held on a 100 mesh screen.

10. A procees according to claim 1 in which the carpet material comprises a woven web backing having extended fibrous tufts interwined therethrough and in which said high viscosity polyolefin and said low viscosity satuated hydrocarbon in their molten states penetrate the interstices of said web such that on the cooling of said polyolefin and said hydrocarbon said tufts are firmly bonded to said woven web.

11. A process according to claim 10 in which the heat applied to said low viscosity saturated hydrocarbon is sufficient to permit at least partial penetration thereof into said tufts.

12. A process according to claim 1 in which said low viscosity saturated hydrocarbon is selected from the group consisting of petroleum wax, synthetic Fischer-Tropsch wax, mineral wax, vegetable wax, and low molecular weight polyolefin.

13. The process according to claim 1 wherein the moisture content of the carpet material is maintained at about 2 percent or below by weight.

14. In a process for manufacturing a moldable carpet, the improvement of impregnating said carpet with a composition consisting of a mixture of two powdered saturated thermoplastic hydrocarbon components of differing viscosity and molecular weight, the component of higher viscosity and molecular weight being present in larger proportion than the component of lower viscosity and molecular weight.

15. A process according to claim 14 in which the concentration in said composition of the component having higher viscosity and molecular weight is greater on the surface of said carpet than it is in the interior of said carpet.

16. In a process for manufacturing a moldable carpeting material, the improvement of applying to the backing of said carpeting material a composition comprising a high viscosity polyolefin with a melt index not greater than 70 and a low viscosity saturated hydrocarbon with a melting point not less than 190° F., said high viscosity polyolefin and said low viscosity saturated hydrocarbon being present in the proportions of from 95:5 to 55:45 by weight, respectively.

17. A composite contoured carpet for automobile floors and the like comprising a carpeting material, a thermoplastic coating layer or the underside of said carpeting material, and a backing pad bonded to said thermoplastic coating layer, said thermoplastic coating layer comprising a mixture of a high viscosity polyolefin and a low viscosity saturated hydrocarbon, the weight ratio of said high polyolefin to said low viscosity hydrocarbon being in the range of 55:45 to 95:5, said low viscosity hydrocarbon having a melting point not less than 190° F. and a viscosity not exceeding 1000 centipoises at 125° C., and said high viscosity polyolefin having a melt index not in excess of 70.

18. A carpet according to claim 16 in which said polyolefin has a density of 0.900 to 0.940.

19. A carpet according to claim 16 in which said high viscosity polyolefin is polyethylene.

20. A carpet according to claim 16 in which said polyethylene has a density of 0.915 to 0.940 and a melt index in the range of 5 to 25.

21. A carpet according to claim 16 in which said low viscosity hydrocarbon is selected from the group consisting of petroleum wax, synthetic Fischer-Topsch wax, mineral wax, vegetable wax, and low molecular weight polyolefin.

22. A carpet according to claim 16 in which the weight ratio of said high viscosity polyolefin to said low viscosity hydrocarbon is in the range of 75:25 to 80:20.

References Cited

UNITED STATES PATENTS

| 2,842,508 | 7/1958 | Sterk | 260—28.5 |
| 2,868,762 | 1/1959 | Oakes. | |
| 3,150,024 | 9/1964 | Penman | 156—229 |
| 3,414,458 | 12/1968 | Lacy | 161—67 |

FOREIGN PATENTS

| 971,958 | 10/1964 | Great Britain. |

ROBERT F. BURNETT, Primary Examiner

R. H. CRISS, Assistant Examiner

U.S. Cl. X.R.

117—21, 76; 156—72, 283; 161—66

PO-1050
(5/69)

UNITED STATES PATENT OFFICE
CERTIFICATE OF CORRECTION

Patent No. 3,525,662            Dated August 25, 1970

Inventor(s) John W. Padgett, et al

It is certified that error appears in the above-identified patent and that said Letters Patent are hereby corrected as shown below:

Pursuant to Rule 323

Col. 2, Line 64
    delete "scrin" and insert --scrim--.
Col. 4, Line 64
    delete "is" and insert --in--.
Col. 5, Line 43
    delete "low quality" and insert --low density--.

Pursuant to Rule 322

Col. 5, Line 9
    delete "are of" (first occurance).

Col. 6, Line 43
    delete "fractional" and insert --frictional--.
Col. 6, Line 45
    delete "polyolefins" and insert --polyolefin--.
Col. 6, Line 53
    delete "mates" and insert --mats--.
Col. 6, Line 57
    delete "powder" and insert --powdered--.
Col. 8, Line 14
    delete "or" and insert --on--.
Col. 8, Line 19
    after "high" insert --viscosity--.
Col. 8, Line 34
    delete "Topsch" and insert --Tropsch--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents